(12) United States Patent
Churi et al.

(10) Patent No.: US 8,170,998 B2
(45) Date of Patent: May 1, 2012

(54) METHODS, SYSTEMS, AND COMPUTER PROGRAM PRODUCTS FOR ESTIMATING ACCURACY OF LINKING OF CUSTOMER RELATIONSHIPS

(75) Inventors: Prashant Sharad Churi, Scottsdale, AZ (US); Gary Stephen Fitzgerald, Phoenix, AZ (US); Sara Tresch, New York, NY (US); Mary Weissman, Mesa, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 365 days.

(21) Appl. No.: 11/854,259

(22) Filed: Sep. 12, 2007

(65) Prior Publication Data
US 2009/0070289 A1 Mar. 12, 2009

(51) Int. Cl.
G06F 7/00 (2006.01)
G06F 17/00 (2006.01)
(52) U.S. Cl. .................... 707/690; 707/692
(58) Field of Classification Search .......... 707/200–206, 707/610, 690, 692
See application file for complete search history.

(56) References Cited

U.S. PATENT DOCUMENTS

| | | | |
|---|---|---|---|
| 5,920,629 A | 7/1999 | Rosen | |
| 5,966,695 A | 10/1999 | Melchione et al. | |
| 5,995,946 A | 11/1999 | Auzenne et al. | |
| 6,185,569 B1 * | 2/2001 | East et al. | 707/101 |
| 6,523,019 B1 * | 2/2003 | Borthwick | 706/45 |
| 7,043,476 B2 | 5/2006 | Robson | |
| 7,069,264 B2 * | 6/2006 | Anjur et al. | 1/1 |
| 7,376,680 B1 * | 5/2008 | Kettler et al. | 707/205 |
| 7,490,059 B2 | 2/2009 | Albee et al. | |
| 7,562,067 B2 * | 7/2009 | Chaudhuri et al. | 707/2 |
| 7,840,571 B2 | 11/2010 | Forman et al. | |
| 2002/0023217 A1 | 2/2002 | Wheeler et al. | |
| 2002/0059187 A1 * | 5/2002 | Delo et al. | 707/1 |
| 2002/0072927 A1 | 6/2002 | Phelan et al. | |
| 2003/0084024 A1 | 5/2003 | Christensen et al. | |
| 2003/0204460 A1 | 10/2003 | Robinson et al. | |
| 2004/0204958 A1 | 10/2004 | Perkins et al. | |
| 2004/0220865 A1 | 11/2004 | Lozowski et al. | |
| 2005/0060332 A1 | 3/2005 | Bernstein et al. | |
| 2005/0108631 A1 * | 5/2005 | Amorin et al. | 715/513 |
| 2005/0147225 A1 | 7/2005 | Mallick et al. | |
| 2005/0149527 A1 | 7/2005 | Berlin et al. | |

(Continued)

OTHER PUBLICATIONS

USPTO; Preinterview First Office Action dated Oct. 2, 2008 in U.S. Appl. No. 11/529,604.

(Continued)

*Primary Examiner* — Kuen Lu
*Assistant Examiner* — Susan F Rayyan
(74) *Attorney, Agent, or Firm* — Snell & Wilmer L.L.P.

(57) ABSTRACT

The disclosed methods, systems, and computer-program products allow a business to estimate linking errors in customer relationships in a database and to identify metrics that improve the linking accuracy. In an embodiment, a plurality of sample customer relationships are selected from a database to form a sample data set that is statistically representative of the database. Potential linking errors are then identified within the sample data set. The identified potential linking errors are then validated to identify actual linking errors in the sample data set. Once validated, the actual linking errors within the sample data set are used to estimate linking errors within the database. Further, the estimated linking errors in the database may be analyzed to identify one or more factors that contribute to the linking errors.

19 Claims, 11 Drawing Sheets

U.S. PATENT DOCUMENTS

| | | | |
|---|---|---|---|
| 2005/0154664 A1 | 7/2005 | Guy et al. | |
| 2005/0187938 A1 | 8/2005 | Grear et al. | |
| 2005/0262044 A1* | 11/2005 | Chaudhuri et al. | 707/1 |
| 2006/0036543 A1* | 2/2006 | Blagg et al. | 705/39 |
| 2006/0059225 A1 | 3/2006 | Stonehocker et al. | |
| 2006/0080281 A1* | 4/2006 | Bongiorno et al. | 707/1 |
| 2006/0085361 A1* | 4/2006 | Hoerle et al. | 705/75 |
| 2006/0179050 A1* | 8/2006 | Giang et al. | 707/5 |
| 2006/0238919 A1* | 10/2006 | Bradley | 360/128 |
| 2006/0271568 A1* | 11/2006 | Balkir et al. | 707/100 |
| 2006/0282429 A1 | 12/2006 | Hernandez-Sherrington et al. | |
| 2007/0016616 A1* | 1/2007 | Brill et al. | 707/104.1 |
| 2007/0192122 A1 | 8/2007 | Routson et al. | |
| 2007/0208787 A1* | 9/2007 | Cheng et al. | 707/204 |
| 2008/0154541 A1* | 6/2008 | Gemulla et al. | 702/181 |
| 2008/0208735 A1* | 8/2008 | Balet et al. | 705/39 |
| 2008/0222207 A1* | 9/2008 | Ito | 707/200 |
| 2008/0301016 A1 | 12/2008 | Durvasula et al. | |
| 2009/0070289 A1* | 3/2009 | Churi et al. | 707/2 |

OTHER PUBLICATIONS

USPTO; Office Action dated Nov. 21, 2008 in U.S. Appl. No. 11/529,604.
USPTO; Office Action dated Mar. 23, 2009 in U.S. Appl. No. 11/529,604.
USPTO; Final Office Action dated Oct. 13, 2009 in U.S. Appl. No. 11/529,604.
USPTO; Advisory Action dared Jan. 26, 2010 in U.S. Appl. No. 11/529,604.
USPTO; Office Action dated Mar. 8, 2011 in U.S. Appl. No. 11/529,604.
USPTO; Final Office Action dated Aug. 17, 2011 in U.S. Appl. No. 11/529,604.
USPTO; Advisory Action dared Oct. 24, 2011 in U.S. Appl. No. 11/529,604.
USPTO; Office Action dated Dec. 11, 2008 in U.S. Appl. No. 11/677,906.
USPTO; Office Action dated Jun. 11, 2009 in U.S. Appl. No. 11/677,906.
USPTO; Final Office Action dated Jan. 7, 2010 in U.S. Appl. No. 11/677,906.
USPTO; Advisory Action dated Mar. 5, 2010 in U.S. Appl. No. 11/677,906.
USPTO; Office Action dated Apr. 1, 2010 in U.S. Appl. No. 11/677,906.
USPTO; Final Office Action dated Aug. 26, 2010 in U.S. Appl. No. 11/677,906.
USPTO; Advisory Action dated Nov. 12, 2010 in U.S. Appl. No. 11/677,906.
USPTO; Office Action dated Jun. 9, 2011 in U.S. Appl. No. 11/677,906.
USPTO; Office Action dated Jul. 8, 2009 in U.S. Appl. No. 11/755,313.
USPTO; Final Office Action dated Jan. 8, 2010 in U.S. Appl. No. 11/755,313.
USPTO; Advisory Action dated Mar. 1, 2010 in U.S. Appl. No. 11/755,313.
USPTO; Office Action dated Jan. 19, 2010 in U.S. Appl. No. 11/867,640.
USPTO; Final Office Action dated Nov. 16, 2010 in U.S. Appl. No. 11/867,640.
USPTO; Advisory Action dated Jan. 26, 2011 in U.S. Appl. No. 11/867,640.
USPTO; Office Action dated Feb. 25, 2011 in U.S. Appl. No. 11/867,640.
USPTO; Office Action dated Jul. 1, 2011 in U.S. Appl. No. 11/867,640.
PCT; International Search Report and Written Opinion dated May 28, 2008 in Application No. PCT/US2008/06711.
PCT; International Preliminary Report on Patentability dated Dec. 1, 2009 in Application No. PCT/US2008/06711.

* cited by examiner

| Customer Number | Account Number | Name | Street Address | City | State | Zip | SSN | Year of Birth | Account Type |
|---|---|---|---|---|---|---|---|---|---|
| 115152017 | 122245288 270865 | Wesley T Rodgers | 1067 Main St | N Huntingdon | CA | 15642 | 123578977 | N/A | Basic |

| Customer Number | Account Number | Name | Street Address | City | State | Zip | SSN | Year of Birth | Account Type |
|---|---|---|---|---|---|---|---|---|---|
| 1151 52017 | 122245288 270865 | Wesley T Rodgers | 1067 Main St | N Huntingdon | CA | 15642 | 123578977 | N/A | Basic |
| | ⇔ | ⇔ | ⇔ | ⇔ | ⇔ | ⇔ | ⇔ | ⇔ | ⇔ |
| 1151 52017 | 355202059 212335 | Wesley T Rodgers | 500 Pearl Ct | Mesquite | AZ | 75149 | 123789328 | N/A | Basic |
| Rating | | 5 | 1 | 1 | 1 | 1 | 1 | 0 | 5 |

502 (top row), 512 (bottom row)

Overall Rating = 1
=> Accounts not linked Correctly
=> Overlink Error

| Name | Address | Phone | SSN | YOB | Overall |
|---|---|---|---|---|---|
| 5 | 5 | 5 | 5 | 5 | 5 |
| 5 | 5 | 5 | 5 | 3 | 5 |
| 5 | 5 | 5 | 5 | 1 | 5 |
| 5 | 5 | 5 | 5 | 0 | 5 |
| 5 | 5 | 5 | 4 | 5 | 4 |
| 5 | 5 | 5 | 4 | 3 | 4 |
| 5 | 5 | 5 | 4 | 1 | 4 |
| 5 | 5 | 5 | 4 | 0 | 4 |
| 5 | 5 | 5 | 3 | 5 | 5 |
| 5 | 5 | 5 | 3 | 3 | 4 |
| 5 | 5 | 5 | 3 | 1 | 4 |
| 5 | 5 | 5 | 3 | 0 | 4 |
| 5 | 5 | 5 | 1 | 5 | 4 |
| 5 | 5 | 5 | 1 | 3 | 4 |
| 4 | 1 | 1 | 5 | 5 | 3 |
| 5 | 5 | 5 | 1 | 0 | 3 |
| 5 | 5 | 5 | 0 | 5 | 5 |
| 5 | 5 | 5 | 0 | 3 | 4 |
| 5 | 5 | 5 | 0 | 1 | 4 |
| 5 | 5 | 4 | 0 | 0 | 4 |
| 5 | 5 | 4 | 5 | 5 | 5 |
| 5 | 5 | 4 | 5 | 3 | 4 |
| 5 | 5 | 4 | 5 | 1 | 4 |
| 5 | 5 | 4 | 4 | 0 | 4 |
| 5 | 5 | 4 | 4 | 5 | 4 |
| 5 | 5 | 4 | 4 | 3 | 4 |
| 5 | 5 | 4 | 4 | 1 | 4 |
| 5 | 5 | 4 | 3 | 0 | 4 |
| 5 | 5 | 4 | 3 | 5 | 4 |

Example

CLIC Customer Number: 014197688018

| Element | Account 1 | Account 2 | Score |
|---|---|---|---|
| Name | Michael Patrick Smith | Michael P Smith | 4 |
| Address | 1234 Cumberland Pkwy SE 3505 Atlanta GA 303396136 | 111 Yale Dr Rancho Mirage CA 922703074 | 1 |
| Phone | (811) 100-9005 | (811) 200-1457 | 1 |
| SSN | 123-45-6789 | 123-45-6789 | 5 |
| Year of Birth | 1969 | 1969 | 5 |
| Overall Score | | | 3 |

FIG. 6

Key Generation

| Test Record | First Name | Last Name | SSN | YOB | Street | City | State | ZIP | Phone |
|---|---|---|---|---|---|---|---|---|---|
| | Mohammad | Karim | 123456789 | 1963 | 1212 Newkirk Ave Apt 5G | Brooklyn | NY | 112301551 | 811 555 0429 |

| Key # | Composite Key | Comparison Against Test Record |
|---|---|---|
| 1 | Entire LN, First 3 chars of FN, Region | Karim, Moh, NY |
| 2 | First 3 chars of LN, Entire FN, Region | Kar, Mohammad, NY |
| 3 | Entire FN, City, Region | Mohammad, Brooklyn, NY |
| 4 | Entire FN, First 3 digits of Phone | Mohammad, 811 |
| 5 | Entire FN, YOB | Mohammad, 1963 |
| 6 | Entire FN, First 3 digits of SSN | Mohammad, 123 |
| 7 | Entire LN, Entire FN | Karim, Mohammad |
| 8 | Entire LN, First 3 digits of SSN | Karim, 123 |
| 9 | Entire LN, YOB | Karim, 1963 |
| 10 | Entire LN, First 3 digits of Phone | Karim, 811 |

FIG. 8

| Business Unit | % Availability | | | | | % Validity | | | | | % Underlink Errors |
|---|---|---|---|---|---|---|---|---|---|---|---|
| | Name | Addr | SSN | DOB | Phone | Name | Addr | SSN | DOB | Phone | |
| 1 | 100.0 | 99.5 | 90.9 | 100.0 | 75.3 | 100.0 | 97.3 | 90.9 | 54.2 | 75.0 | 1.23 |
| 2 | 100.0 | 100.0 | 68.9 | 100. | 58.9 | 100.0 | 99.5 | 68.9 | 50.2 | 58.9 | 3.47 |
| 3 | 100.0 | 100.0 | 92.0 | 100. | 88.3 | 100.0 | 78.7 | 82.0 | 0.00 | 88.3 | 2.11 |
| 4 | 100.0 | 100.0 | 100.0 | 100.0 | 100.0 | 100.0 | 100.0 | 100.0 | 100.0 | 100.0 | 0.00 |

FIG. 10A

| Business Unit | % Availability | | | | | % Validity | | | | | % Overlink Errors |
|---|---|---|---|---|---|---|---|---|---|---|---|
| | Name | Addr | SSN | DOB | Phone | Name | Addr | SSN | DOB | Phone | |
| 1 | 100.0 | 99.8 | 90.2 | 100.0 | 74.9 | 100.0 | 97.7 | 90.2 | 53.6 | 74.5 | 0.29 |
| 2 | 100.0 | 100.0 | 67.7 | 100.0 | 60.8 | 100.0 | 98.2 | 67.7 | 46.0 | 60.7 | 0.72 |
| 3 | 100.0 | 100.0 | 92.4 | 100.0 | 90.4 | 100.0 | 75.4 | 92.4 | 0.00 | 90.2 | 0.00 |
| 4 | 100.0 | 99.8 | 87.6 | 100.0 | 74.9 | 100.0 | 95.2 | 87.5 | 46.4 | 74.6 | 0.00 |

FIG. 10B

METHODS, SYSTEMS, AND COMPUTER PROGRAM PRODUCTS FOR ESTIMATING ACCURACY OF LINKING OF CUSTOMER RELATIONSHIPS

BACKGROUND

1. Field of the Invention

This invention generally relates to managing information in a database, and in particular, it relates to methods for determining the accuracy of linked relationships in a database.

2. Related Art

Customers often have more than one account established through a business, especially with a service-oriented business such as a financial services company or an insurance business. In the case of the financial services industry, for example, a single customer may have any combination of a personal bank account, a mortgage, a line of credit (such as a home equity line of credit), a personal credit card, a business credit card, a rewards account, and one or more investment accounts with a single financial institution. In the insurance business, a single customer may have any combination of health insurance, auto insurance, home owners insurance, and other kinds of insurance protection as well. Even with non-service businesses, a single customer may have multiple accounts. For example, a single customer may have one account with a computer supply company for home purchases and another account with the same company for small business purchases.

It is important for a company to recognize that all of the customer's accounts belong to a single customer and to link those accounts, in order to appropriately market to the customer without overloading the customer. Further, ensuring that all accounts for a given customer are, in fact, accurately associated with that customer is vital for businesses that offer risk management and decision-support to their customers. The correct linking of accounts with a customer can improve the accuracy of the financial company's estimate of the financial status of the customer.

In practice, accurately linking accounts with a single customer proves to be a non-trivial undertaking. It is possible to associate one or more accounts with a single customer based on unique customer identifying information, such as the customer name, social security number, date of birth, address, and other distinctive or unique identifiers. However, the association process is fallible, as it is possible that variations may creep into the way a customer's name or address is recorded, or simply that errors are made during the process of collecting customer identifying data. People change addresses over time, or change their name, which can thwart efforts to make account associations based on the name, address, or other time-variant identification data.

Still another factor which makes it difficult to effectively recognize which accounts are, in fact, associated with a single customer is the size of many businesses. A large service business, such as a large financial institution, may have multiple business units. Often, these business units do not efficiently or effectively share information, since in some cases data processing may be distributed over multiple computer systems and software systems. As a result customer information can be fragmented over these multiple data processing systems and their associated databases.

The difficulties inherent to the linking process often result in errors in the linking process. For example, it is possible that that accounts which actually belong to two separate customers may become associated, within the business database, with a single customer and thus be incorrectly linked. Further, it may also be possible that two accounts belonging to a single customer may not be associated with that customer in the business database.

Therefore, it is essential to businesses, such as the financial services industries, to identify the linking errors present in their associated databases and identify and address the underlying causes of these linking errors. However, existing techniques are generally incapable of providing accurate estimates of the linking errors within business databases and a detailed understanding of the causes of these errors.

SUMMARY OF THE INVENTION

Accordingly, the present disclosure introduces methods, systems, and computer-program products for estimating the accuracy of linking of customer relationships in a database.

According to various embodiments of the disclosed processes, a plurality of sample customer relationships are selected from a database to form a sample data set. Potential linking errors are then identified within the sample data set. These potential linking errors may include errors resulting from at least one of linked relationships associated with different customers and unlinked relationships associated with the same customer. The identified potential linking errors are then validated to identify actual linking errors in the sample data set.I Identified linking errors in the sample set are then used to estimate linking errors within the database. The estimated linking errors within the database may be analyzed to identify one or more factors that contribute to the linking errors.

Further features and advantages of the present invention as well as the structure and operation of various embodiments of the present invention are described in detail below with reference to the accompanying drawings.

BRIEF DESCRIPTION OF THE DRAWINGS

The features of the present invention will become more apparent from the detailed description set forth below when taken in conjunction with the drawings. The left-most digit of a reference number identifies the drawing in which the reference number first appears.

FIG. 3 illustrates an exemplary record for a customer relationship.

FIGS. 5 and 6 are examples that illustrate the method of FIG. 4.

FIG. 8 is an example that illustrates the method of FIG. 7.

FIGS. 10A and 10B are examples that illustrate linking error rates as a function of both input data and database category.

DETAILED DESCRIPTION

Figure 1:
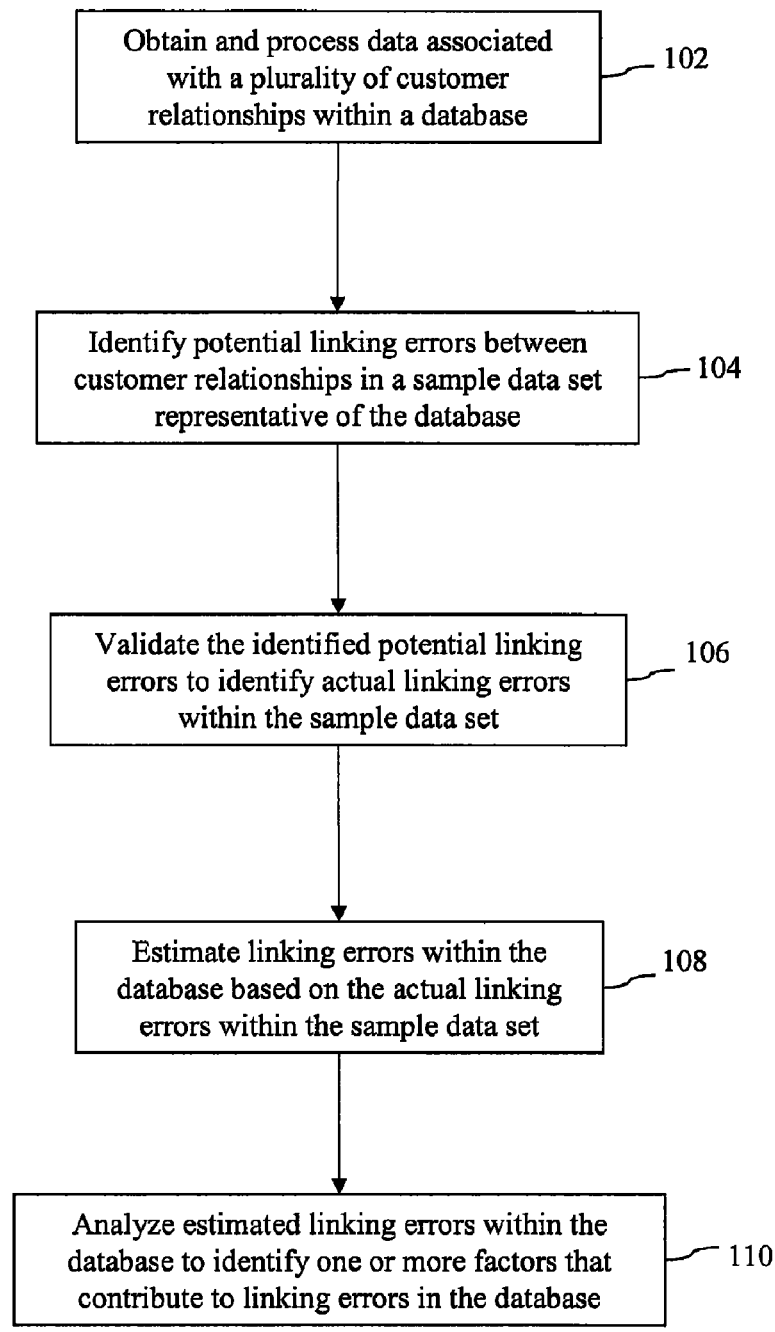
FIG. 1 illustrates an exemplary method for estimating linking errors in customer relationships in a database.

The present invention, as described below, may be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

I. Terminology

The terms "user", "end user", "consumer", "customer", "participant", and/or the plural form of these terms are used interchangeably throughout herein to refer to those persons or entities capable of accessing, using, being affected by and/or benefiting from the tool described herein.

Furthermore, the terms "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

A "customer relationship," as used herein, refers to a relationship established between a customer and a business. In one example, a customer relationship may be an account established between a customer and a service oriented business, such as a financial services company or a consumer travel agency. In the case of the financial services industry, for example, a single customer may have any combination of a personal bank account, a mortgage, a line of credit (such as a home equity line of credit), a personal credit card, a business credit card, a rewards account, and one or more investment accounts with a single financial institution.

A "transaction account" as used herein refers to an account associated with an open account or a closed account system (as described below). The transaction account may exist in a physical or non-physical embodiment. For example, a transaction account may be distributed in non-physical embodiments such as an account number, frequent-flyer account, telephone calling account or the like. Furthermore, a physical embodiment of a transaction account may be distributed as a financial instrument. The terms "account provider" or "financial institution" as used herein refer to the financial institution associated with the account.

A financial transaction instrument may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or be a fob having a transponder and an RFID reader.

"Open cards" are financial transaction cards that are generally accepted at different merchants. Examples of open cards include the American Express®, Visa®, MasterCard® and Discover® cards, which may be used at many different retailers and other businesses. In contrast, "closed cards" are financial transaction cards that may be restricted to use in a particular store, a particular chain of stores or a collection of affiliated stores. One example of a closed card is a pre-paid gift card that may only be purchased at, and only be accepted at, a clothing retailer, such as The Gap® store.

Stored value cards are forms of transaction instruments associated with transaction accounts, wherein the stored value cards provide cash equivalent value that may be used within an existing payment/transaction infrastructure. Stored value cards are frequently referred to as gift, pre-paid or cash cards, in that money is deposited in the account associated with the card before use of the card is allowed. For example, if a customer deposits ten dollars of value into the account associated with the stored value card, the card may only be used for payments together totaling no more than ten dollars.

With regard to use of a transaction account, users may communicate with merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit implemented in the form of a computer-server, although other implementations are possible.

In general, transaction accounts may be used for transactions between the user and merchant through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

Persons skilled in the relevant arts will understand the breadth of the terms used herein and that the exemplary descriptions provided are not intended to be limiting of the generally understood meanings attributed to the foregoing terms.

II. Overview

The processes now introduced allow a business, such as a service-oriented business or a financial services company, to estimate linking errors in customer relationships in a database and to identify metrics that improve the linking accuracy. In embodiments of such processes, a plurality of sample customer relationships are selected from a database to form a sample data set that is statistically representative of the database. Potential linking errors are then identified within the sample data set, and these potential linking errors may include overlink errors (i.e., those errors resulting from linked relationships associated with different customers) and under-link errors (i.e., those errors resulting from unlinked relationships associated with the same customers). The identified potential linking errors are then validated to identify actual linking errors in the sample data set. Once validated, the actual linking errors within the sample data set are used to estimate linking errors within the database. Further, the estimated linking errors in the database may be analyzed to identify one or more factors that contribute to the linking errors.

III. Methods, Systems, and Computer-Program Products for Estimating Accuracy of Linking of Customer Relationships FIG. 1 is an overview of an exemplary method 100 for estimating linking errors between customer relationships in a database. In one embodiment, the database may be associated with a business, and the database may include a plurality of customer relationships established between the business and a corresponding plurality of customers. For example, the customer relationship may be associated with a financial transaction instrument held by a customer and provided by a financial services company, such as American Express Company, Inc., of New York, N.Y. In addition, the customer relationship may describe a relationship between a customer and a service-oriented company, such as a consumer travel agency or insurance company.

Elements of data that describe (i) the plurality of customer relationships and (ii) the customers associated with the plurality of customer relationships are obtained in step 102. The obtained elements of data are subsequently processed to generate a single record that describes the elements of data associated with the customer relationship. In step 102, the relationships within the database are also profiled and categorized into one or more of a plurality of categories, and statistical distributions of the customer relationships are developed on the basis of the categorized relationships.

In step 104, potential linking errors between customer relationships are identified in a sample data set that is representative of the database. In one embodiment, the potential linking errors may result from any combination of overlink errors (i.e., those errors resulting from linked relationships associated with different customers) and underlink errors (i.e., those errors resulting from unlinked relationships associated with the same customer). The potential linking errors may be identified based on a comparison of data elements associated with each of a pair of customer relationships, and this comparison may yield a set of elemental scores for the pair that are combined to generate a composite score that identifies a potential linking error between the pair of customer accounts.

Once identified within step 104, potential linking errors within the sample data set are verified in step 106 to identify actual linking errors. In one embodiment, potential linking errors are verified manually through an inspection of the relevant relationship records. Further, the manual verification process of step 106 may include applying of a number of business rules to the relationships associated with potential linking errors.

For example, step 104 may identify a potential linking error between two customer relationships associated with the same customer number and different last names. The manual verification process of step 106 may apply a business rule to the relationships that discounts the potential linking error if the customer associated with the relationships is female. Additionally, or alternatively, the manual verification step may apply business rules that account for relationship type (e.g., different social security numbers for basic and supplemental card accounts), or variations between elements of linked relationships (e.g., different addresses).

In an additional embodiment, only a subset of the identified potential linking errors are manually validated in step 106. The subset may represent a stratified sample of the potential linking errors in the sample data set, and the subset may be statistically representative of both the sample data set and the wider database. In such an embodiment, actual linking errors may be identified within the subset according to the process described above, and the distribution of the actual linking errors in the subset may be extrapolated to estimate a number of linking errors within the sample data set.

In step 108, the actual linking errors within the sample data set are used to estimate linking errors in the database. In one embodiment, the distribution of actual linking errors (e.g., both underlink and overlink errors) in the sample data set may be extrapolated to estimate the distribution of linking errors within the database. Further, in an additional embodiment, the distribution of underlink and/or overlink errors may be extrapolated to yield a corresponding distribution of overlink and/or underlink errors in the database. In the various embodiments, the linking errors in the database may be quantified in terms of a magnitude (i.e., a number of errors) or an error rate (i.e., as a percentage of customer relationships).

The elemental scores of each actual linking error may be analyzed in step 110 to identify actionable items that improve the linking process. For example, the analysis of step 110 may indicate that actual linking errors between consumer relationships are relatively high for those relationships that lack social security number data. In such a case, the analysis provides guidance to improve the capture of social security card number data, thus improving the accuracy of linking in customer relationships in the database.

Figure 2:
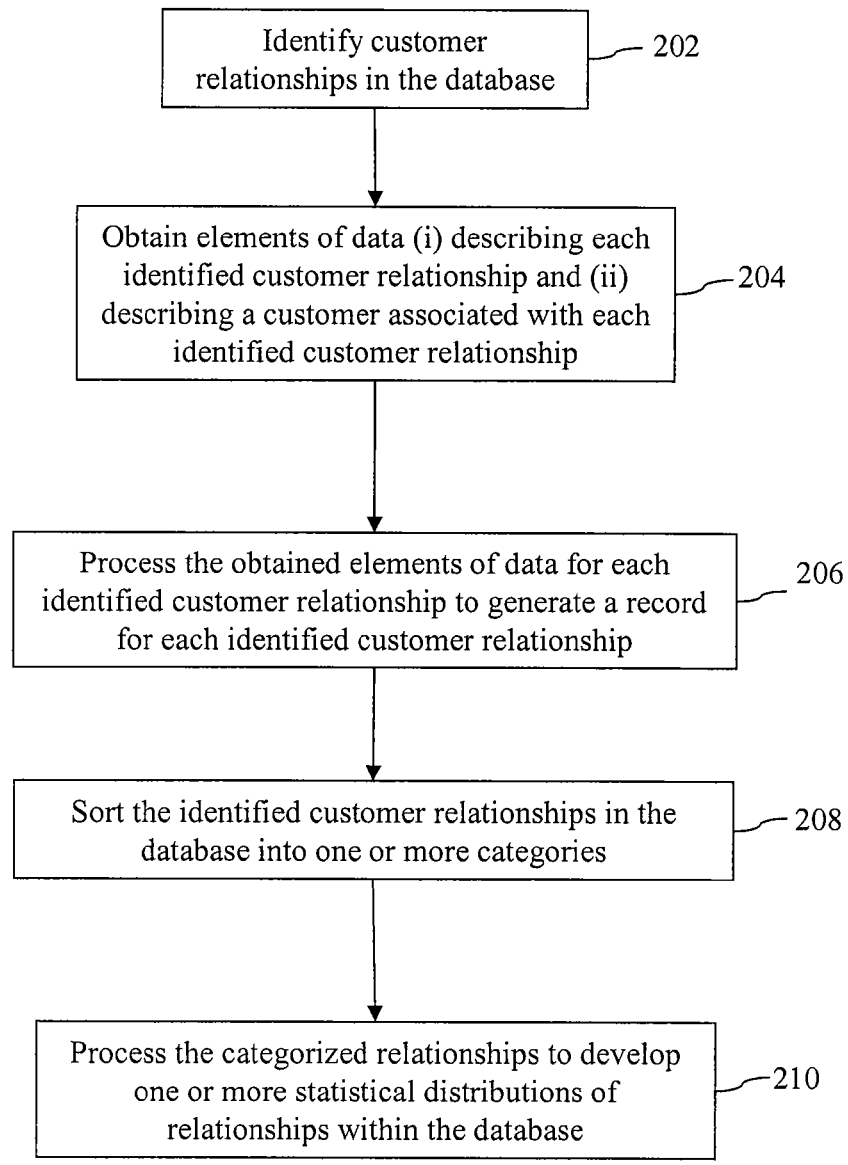
FIG. 2 illustrates a method for obtaining and processing data that may be incorporated into the exemplary method of FIG. 1.

FIG. 2 illustrates a method 200 for obtaining and processing data that may be incorporated into step 102 of exemplary method 100 of FIG. 1. Step 202 identifies those customer relationships within the database for which data will be obtained and processed. In one embodiment, elements of data may be obtained and processed for all customer relationships associated with financial transaction instruments (e.g., card-based relationships). In additional embodiments, data may be obtained and processed for all other customer relationships (e.g., non-card-based relationships) that have been established over a given time period, such as for more than one year. These elements of data may be obtained from any combination of repositories accessible to the business, including additional databases or external sources, such as Experian of Costa Mesa, Calif.

In step 204, elements of data are obtained for each of the plurality of customer relationships identified within step 202. Elements of data obtained in step 204 may include data that describes the customer relationship, including, but not limited to an account or reference number identifying the relationship, a tenure associated with the relationship (e.g., the length of the time the relationship has been established), data identifying the type of the relationship (e.g., a basic transaction account, a supplemental transaction account, a high-value card member (HVCM), etc.), and a customer number associated with the relationship. For example, two or more customer relationships are considered linked to a specific customer if the relationships are both associated with a customer number of the specific customer.

Further, elements of data obtained in step 204 may also include data that describes a customer associated with the relationship, including, but not limited to a full name, an address, a telephone number, a date of birth, and a social security number (SSN). In additional embodiments, the customer data may also include supplementary information, including a supplemental SSN associated with the relationship. The supplemental SSN may, for example, associate a financial transaction instrument with an additional, authorized card holder.

The obtained elements of data are subsequently processed in step 206 to generate a single record that describes the elements of data associated with the customer relationship, and FIG. 3 illustrates an exemplary record that includes various elements of data for a sample relationship. The record stores values of data associated with the sample customer relationship, such as, for example and without limitation, an account number, a customer number, a name, a street address, a city, a state, a zip code, a social security number, and an account type. Further, the exemplary record of FIG. 3 indicates that a year of birth of the customer associated with the relationship is not available.

Referring back to FIG. 2, the relationships within the database are profiled and sorted in step 208 into one or more categories. In one embodiment, the categories may be based on the obtained data elements and/or on the quality of the obtained data elements. In an additional embodiment, the relationships may be sorted into one of six categories, including, but not limited to, a business unit associated with the relationship, a tenure of the relationship, a validity of input data elements (e.g., missing data elements for relationships), a state of the customer (e.g., a high-value card member), a number of linked relationships, and an authenticity of the obtained data.

The categorized relationships are then processed in step 210 to develop one or more statistical distributions of relationships within the database. In one embodiment, a statistical distribution may be generated to reflect the distribution of customer relationships across a corresponding category. For example, a statistical distribution may indicate the number of customer relationships associated with each of four business units of a financial services company. Additionally, a statistical distribution may describe the number of the customer relationships lacking a SSN data element and/or a year of birth data element. Further, a statistical distribution may be generated to indicate the number of customer relationships linked to basic card members and HVCMs. Although the relationships are described herein with reference specific distributions, one of skill in the art will recognize that additional statistical distributions corresponding to various combinations of categories and data elements may be used without departing from the spirit and scope of the present invention.

Figure 4:
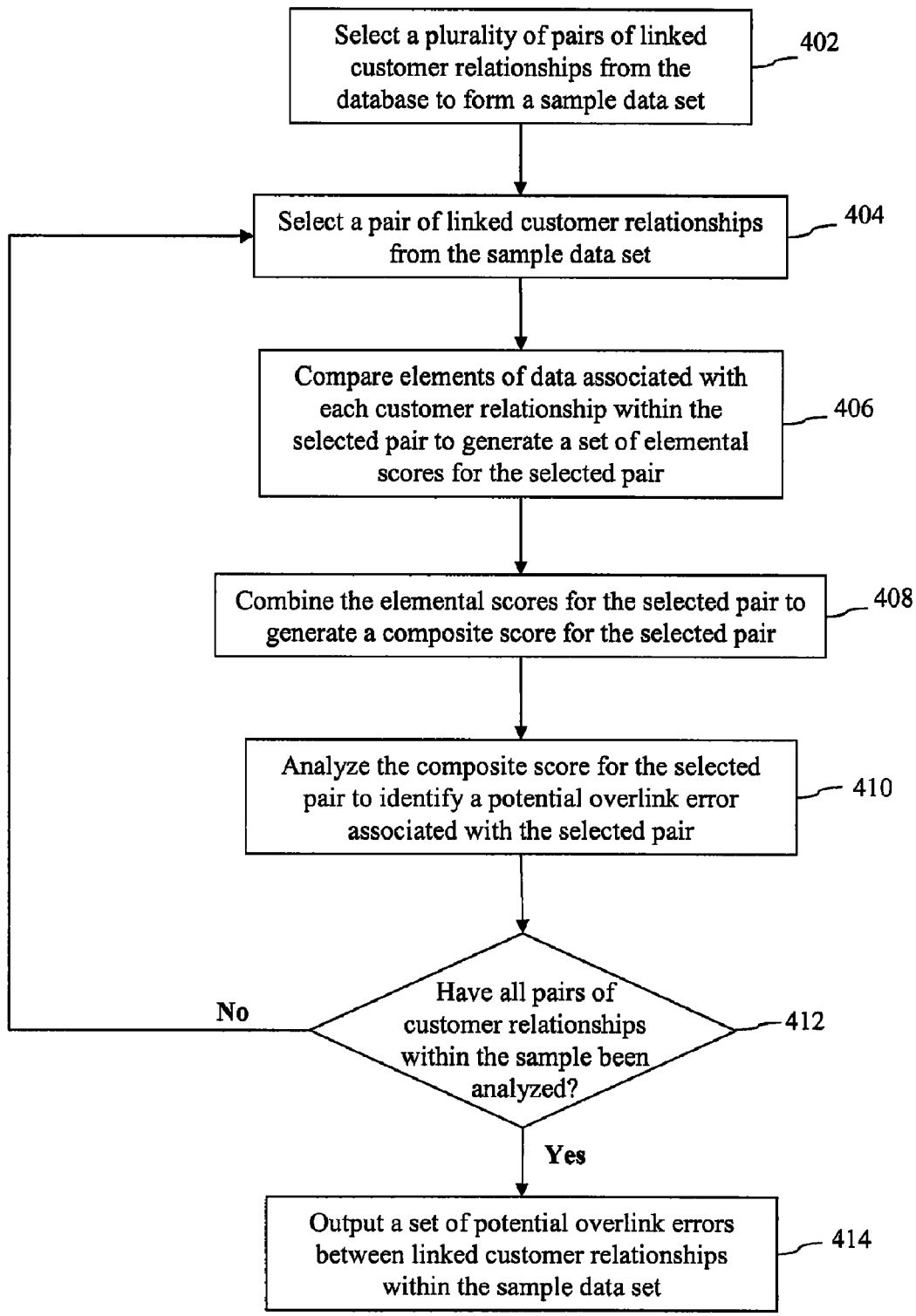
FIG. 4 illustrates a method for identifying potential linking errors that may be incorporated into the exemplary method of FIG. 1.

FIG. 4 illustrates a method 400 for identifying potential linking errors that may be incorporated into exemplary method 100 of FIG. 1. In particular, the embodiment of FIG. 4 identifies potential overlink errors between pairs of customer relationships, i.e., linking errors that result from linked relationships associated with different customers.

In step 402, a plurality of pairs of linked customer relationships, and their corresponding relationship records, are selected from the database to form a sample data set. In one embodiment, the customer relationships represent a statistically significant sample that reflects the statistical properties of the database. That is, the sample data set and the database share a similar distribution of customer and relationship data elements across one or more categories.

In one embodiment, linked customer relationships are selected from the database in a random fashion to form a random sample data set. However, in additional embodiments, an algorithm may be employed to select the plurality of linked customer relationships from the database to generate the sample data set. The algorithm may select the customer relationships from the database in a pseudo-random fashion, or alternatively, in any fashion that would be apparent to one of skill in the art.

Once the sample data set has been generated, step 404 selects a pair of linked customer relationships from the sample set for further analysis. In step 406, respective elements of data associated with each of the selected pair of customer relationships are compared to generate a set of elemental scores for the selected pair. In one embodiment, a set of elemental rules may be applied to respective elements of data associated with the selected pair to generate an elemental score for each element of data. These elemental rules may assign a score ranging from, for example, zero (0) to five (5) for each element of data based on a closeness of a match between the elements of data, wherein five (5) indicates a perfect match and zero (0) indicates missing data. One of skill in the art will recognize that other types of rules and scoring systems may be applied without departing from the spirit and scope of the present invention.

The set of elemental scores for the selected pair is then combined in step 408 to generate a composite score for the selected pair of customer relationships. In one embodiment, one or more rules may be applied to the set of elemental scores to generate a corresponding composite score for the selected pair. For example, a rule may generate a composite score by computing an arithmetic mean or a geometric mean of the individual elemental scores. In additional embodiments, a rule may compute a weighted average of the elemental scores to generate the composite score for the selected pair (e.g., weighing an elemental score of a social security number more than an elemental score of an address).

The composite score for the selected pair is then analyzed in step 410 to identify a potential overlink error associated with the selected pair. In one embodiment, a potential overlink error between the selected pair of customer relationships is identified if the composite score of the selected pair falls below a specific threshold. For example, in the example scoring scheme described above, a composite score below 3.0 (based on elemental scores ranging from 0.0 to 5.0) could indicate that an overlink error exists between the selected pair. In additional embodiments, the identification of overlink errors may be based on any combination of the composite score of the selected pair, generated within step 408, and the set of elemental scores of the selected pair, generated in step 406.

Step 412 then determines whether all pairs of linked customer relationships have been analyzed to identify potential overlink errors. If, in step 412, all pairs of linked customer relationships have been analyzed, then step 414 passes a set of potential overlink errors within the sample back to exemplary method 100 of FIG. 1. Additionally, the set of elemental scores and/or the composite score associated with each potential overlink error may be passed back to exemplary method 100 of FIG. 1.

If, however, step 412 determines that additional pairs of linked customer relationships require analysis, then exemplary method 400 returns to step 404, in which an additional pair of linked customer relationships is selected from the sample data set for analysis.

FIG. 5 is an example that illustrates the method of FIG. 4. In FIG. 5, elements of data associated with a first customer relationship and a second customer relationship have been respectively collected into a first record 502 and a second record 512. The first and second customer relationships are both linked to customer number "115152017," although the first and second customer relationships are associated with different account numbers within respective records 502 and 512.

In the example of FIG. 5, a customer name associated with first relationship exactly matches a customer name associated with the second relationship. Further, an account type associated with first relationship exactly matches an account type associated with second account relationship. Accordingly, both the customer name element and the account type element are assigned an elemental score of five (5), indicative (in this example) of a perfect match.

However, a street address, a city, a state, a zip code, and a social security number associated with the first customer relationship do not match a corresponding street address, a city, a state, a zip code, and a social security number associated with the second customer relationship. As such, elemental scores of one (1) are assigned to the street address, city, state, zip code, and a social security number. Further, there is no data present for a year of birth associated with the respective first and second relationships. As such, the year of birth is assigned an elemental score of zero (0).

The elemental scores for each element associated with the first and second customer relationships are combined to yield an overall composite score. In the example of FIG. 5, a rule is applied to the set of elemental scores that weighs the incomplete information associated with the years of birth and the incorrect matches between the address and social security number more heavily than the perfect matches between the customer name and account type. As such, a composite score of one (1) is assigned to the linked customer relationships and a potential linking error is identified between the first and second customer relationships, which requires additional validation.

FIG. 6 is a second example that illustrates the method of FIG. 4. In FIG. 6, two customer accounts, "Account 1" and "Account 2" are linked to a single customer by customer number "014197688018." An analysis of elements of data (shown under the "Element" heading) associated respectively with Account 1 and Account 2 indicates that the social security number (SSN) and the year of birth of Accounts 1 and 2 are exact matches. As such, the elemental scores for the SSN element and the Year of Birth element are both five (5), using the exemplary scoring scheme described above.

Further, an analysis of the customer name associated with Accounts 1 and 2 indicates an exact match between the respective first and last names, and a match between the initials of the respective middle names. As such, the Name element is assigned an elemental score of four (4), thus indicating a likely match. However, an analysis of the address and phone number respectively associated with Account 1 and Account 2 indicates no match, and therefore, an elemental score of one (1) is assigned to each respective element.

The elemental scores of the linked account pair may be averaged to yield a composite score of three (3), thus indicating that the pair of accounts may be correctly matched (i.e., there may be a weak probability that these accounts are correctly matched). In such a case, the linked Accounts 1 and 2 may not be flagged as potential overlink errors, and no additional validation would be required by the exemplary method.

Figure 7:
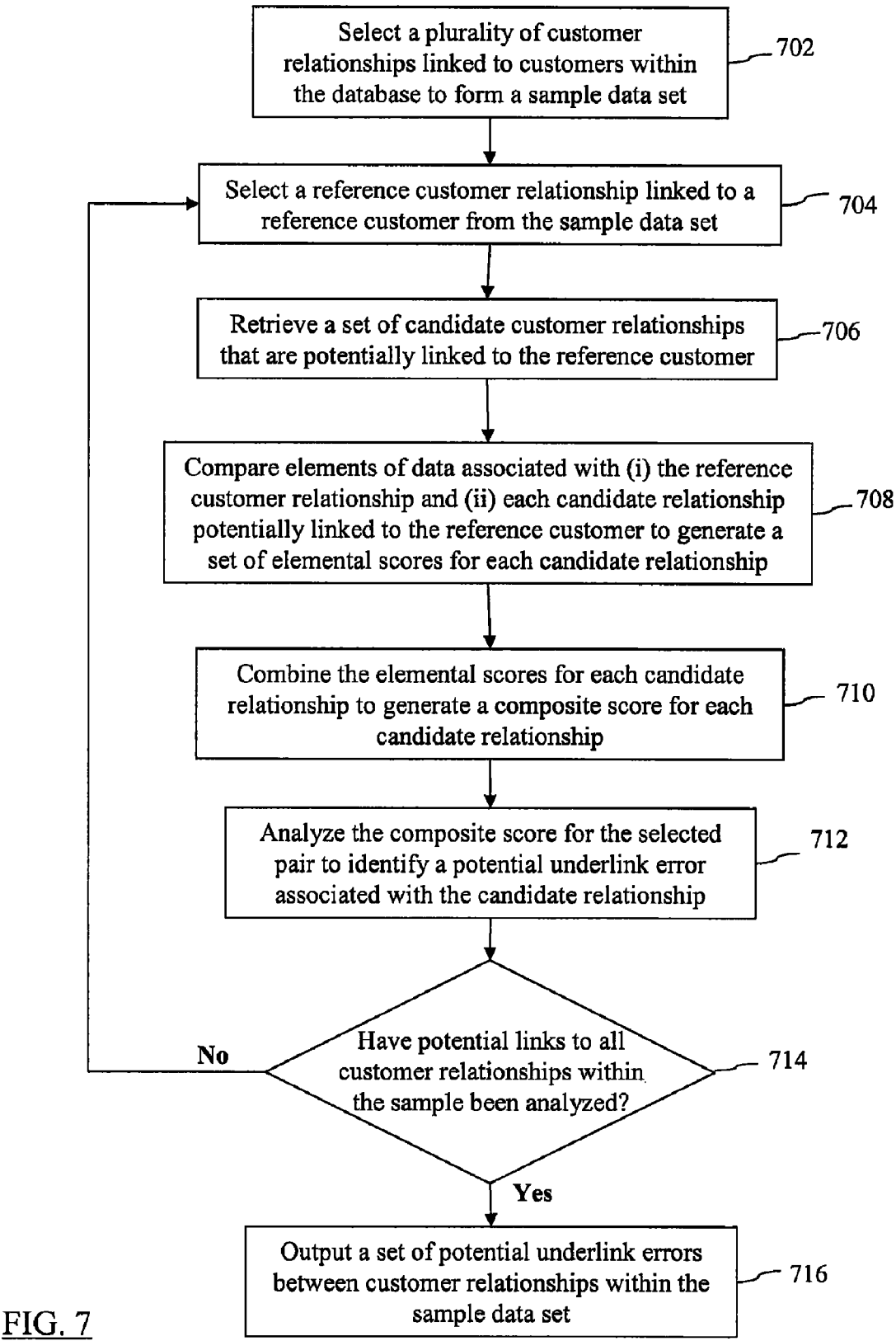
FIG. 7 illustrates an additional method for identifying potential linking errors that may be incorporated into the exemplary method of FIG. 1.

FIG. 7 illustrates a second exemplary method 700 for identifying potential linking errors that may be incorporated into exemplary method 100 of FIG. 1. In contrast to the embodiment of FIG. 4, exemplary method 700 identifies underlink errors within the sample data set, i.e., those errors that result from unlinked relationships associated with the same customer.

In step 702, a plurality of customer relationships linked to a corresponding plurality of customers are selected from the database to form a sample data set. As described above with respect to FIG. 4, the sample set of customer relationships represents a statistically-significant sample of customer relationships that reflects the statistical properties of the database. That is, the sample set and the database share a similar distribution of customer and relationship data elements across one or more categories. Further, an algorithm may be employed within step 702 to select the customer relationships from the database randomly, or in an additional embodiment, the selection of customer references may be performed in a pseudo-random fashion according to the algorithm.

A reference customer relationship linked to a reference customer is selected from the sample set in step 704, and a set of candidate customer relationships that are potentially linked to the reference customer account are retrieved from the sample in step 706. In one embodiment, candidate customer relationships are identified by applying one or more composite keys to each customer relationship in the sample set that is not linked to the reference customer. The composite keys are designed to return a value corresponding to at least a portion of an element of data associated with the customer relationship to which the key is applied, and candidate relationships may be identified by comparing the value returned for each relationship with a value obtained by applying the key to the reference relationship.

FIG. 8 is an example that illustrates application of composite keys to a customer relationship. In one embodiment, a composite key may be based on an entire first name associated with a customer relationship and a year of birth associated with the customer relationship (e.g., Key #5 of FIG. 8). Upon application of the composite key to a test record, a value of "Mohammed, 1963" is returned. If the returned value is consistent with the result obtained from an application of the composite key to a corresponding reference customer relationship, then the test record may be considered a candidate relationship. In additional embodiments, as illustrated by Key #1 through Key #10 of FIG. 8, the composite key may include any portion of any data element associated with a customer record, and a candidate account may be generated on the basis of any combination of the exemplary composite keys in FIG. 8.

Referring back to FIG. 7, elements of data associated with the reference customer relationship are compared with corresponding data elements of each identified candidate customer relationship in step 708 to generate a set of elemental scores for each candidate customer relationship. As described above in reference to FIGS. 4-6, the respective elemental scores may be determined through the application of one or more matching rules to the corresponding pairs of elements.

In step 710, the set of elemental scores for each candidate customer relationship are combined to generate a composite score for each candidate relationship. As described above with respect to FIGS. 4-6, one or more rules may be applied to the set of elemental scores to generate a corresponding composite score for the selected pair. For example, a rule may generate a composite score by computing an arithmetic mean or a geometric mean of the individual elemental scores. In additional embodiments, a rule may compute a weighted average of the elemental scores to generate the composite score for the selected pair (e.g., weighing an elemental score of a social security number more than an elemental score of an address).

The composite score for each candidate relationship is then analyzed to identify a potential underlink error between the reference customer relationship and the respective candidate customer relationship. If the same scoring scheme as described with respect to FIG. 4 is used, in contrast to the embodiment of FIG. 4, potential underlink errors between a candidate relationship and the reference relationship exist if a composite score falls above a specified threshold, thus indicating that the reference relationship should be linked. For example, if a composite score for a pair of reference and candidate relationships fall above 3.0 in the exemplary scoring scheme described above, then the reference relationship and the candidate relationship should potentially be linked and an underlink error may be present between the relationships.

Once the composite scores of each candidate customer relationship have been analyzed to identify potential underlink errors, step 714 determines whether candidate customer relationships have been identified for each customer relationship within the data set. If step 714 determines that all potential underlink errors have been identified within the sample set of customer relationships, then the set of potential underlink errors and their associated customer relationships are output to exemplary method 100 of FIG. 1 for validation. Additionally, the set of elemental scores and/or the composite score associated with each potential underlink error may be passed back to exemplary method 100 of FIG. 1.

If, however, step 714 identifies additional customer relationships within the sample set that require analysis, then method 700 returns to step 704, in which a reference customer relationship is selected for additional analysis in steps 706 through 712.

The processes described above in FIGS. 1-8 provide a mechanism for quantifying errors in linked customer relationship and for quantifying an accuracy rate of linking between customer relationships. In an additional embodiment, the processes described in FIGS. 1-8 may provide a mechanism for quantifying input data quality and identifying actionable items that may improve the accuracy of the linking process.

In one embodiment, the processes described above with respect to FIGS. 1-8 may report additional metrics for each input data element, including, but not limited to, an availability of input data and a validity of input data. The additional data, when coupled to the rates of linking errors (e.g., the rate of overall linking error, the rate of underlink errors, and the rate of overlink errors) may be used to identify actionable items that lead to rapid improvement of linking accuracy.

Figure 9A:
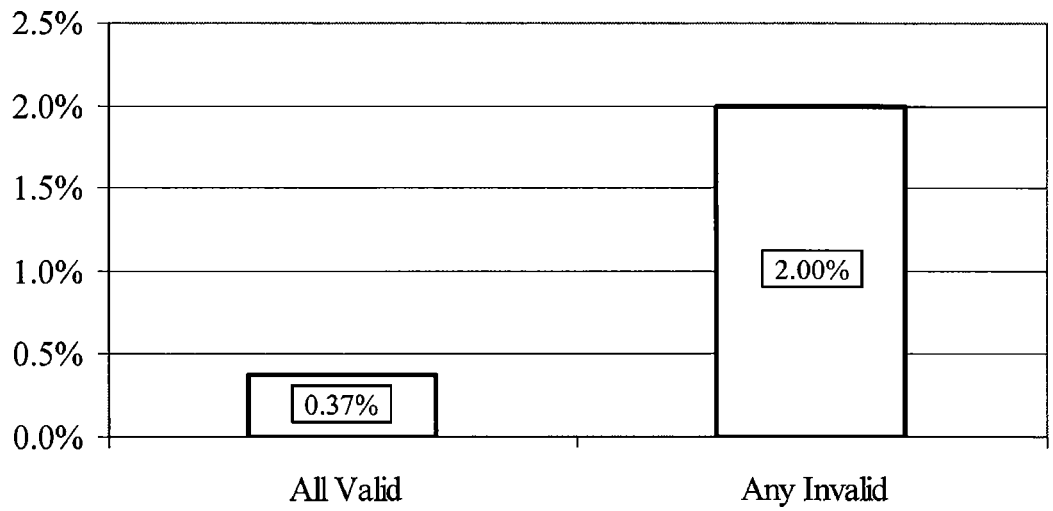
FIGS. 9A and 9B are examples that illustrate linking error rates as a function of input data.
Figure 9B:
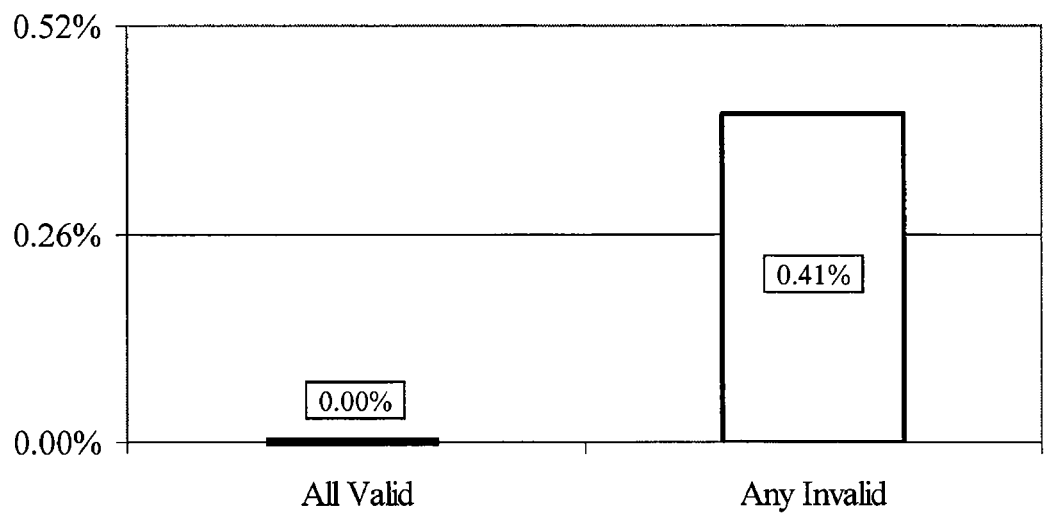

FIGS. 9A and 9B respectively illustrate an exemplary underlink error rate and an exemplary overlink error rate in example customer relationships as a function of the validity of input data elements associated with the customer relationships. In FIG. 9A, the rate of underlink errors in a first statistically-significant sample data set is 0.37% for those relationships in which all input data elements are valid and 2.00% for those relationships characterized by at least one invalid input data element. Further, in FIG. 9B, the rate of overlink errors in a second statistically-significant sample data set is 0.00% for those relationships in which all input data elements are valid and 0.41% for those relationships characterized by at least one invalid input data element.

FIGS. 10A and 10B respectively illustrate an exemplary underlink error rate and an exemplary overlink error rate in exemplary customer relationships associated with various business units as a function of the validity and availability of input data. These input data elements include, but are not limited to, a customer name, a customer address (ADDR), a customer social security number (SSN), a customer date of birth (DOB), and a customer telephone number (PHONE). As such, the methods described above with respect to FIGS. 1-8 may be extended to identify invalid input data elements as a contributing factor to both overlink and underlink errors between customer relationships.

FIGS. 10A and 10B respectively indicate that the relative high rates of overlink and underlink errors in Business Unit 2 may be partially explained by the relatively low availability of data for the customer social security number and/or the customer telephone number. As such, by improving the collection of data within Business Unit 2, especially that data relating to the customer social security number and the customer telephone number, the rate of underlink and overlink errors between customer relationships within the business unit may be improved. Therefore, the methods described above with respect to FIGS. 1-8 may be extended to identify actionable items that may increase the linking accuracy of the customer relationships within the database.

The embodiments of FIGS. 9A-9B and 10A-10B have been described in terms of specific input data elements and specific database categories, such as business units. The present invention is not limited to such embodiments, and one skilled in the art(s) would recognize that the methods of FIGS. 1-8 may be extended to analyze linking errors as a function of any number of input data elements and any number of database categories.

IV. Exemplary Computer Systems

Figure 11:
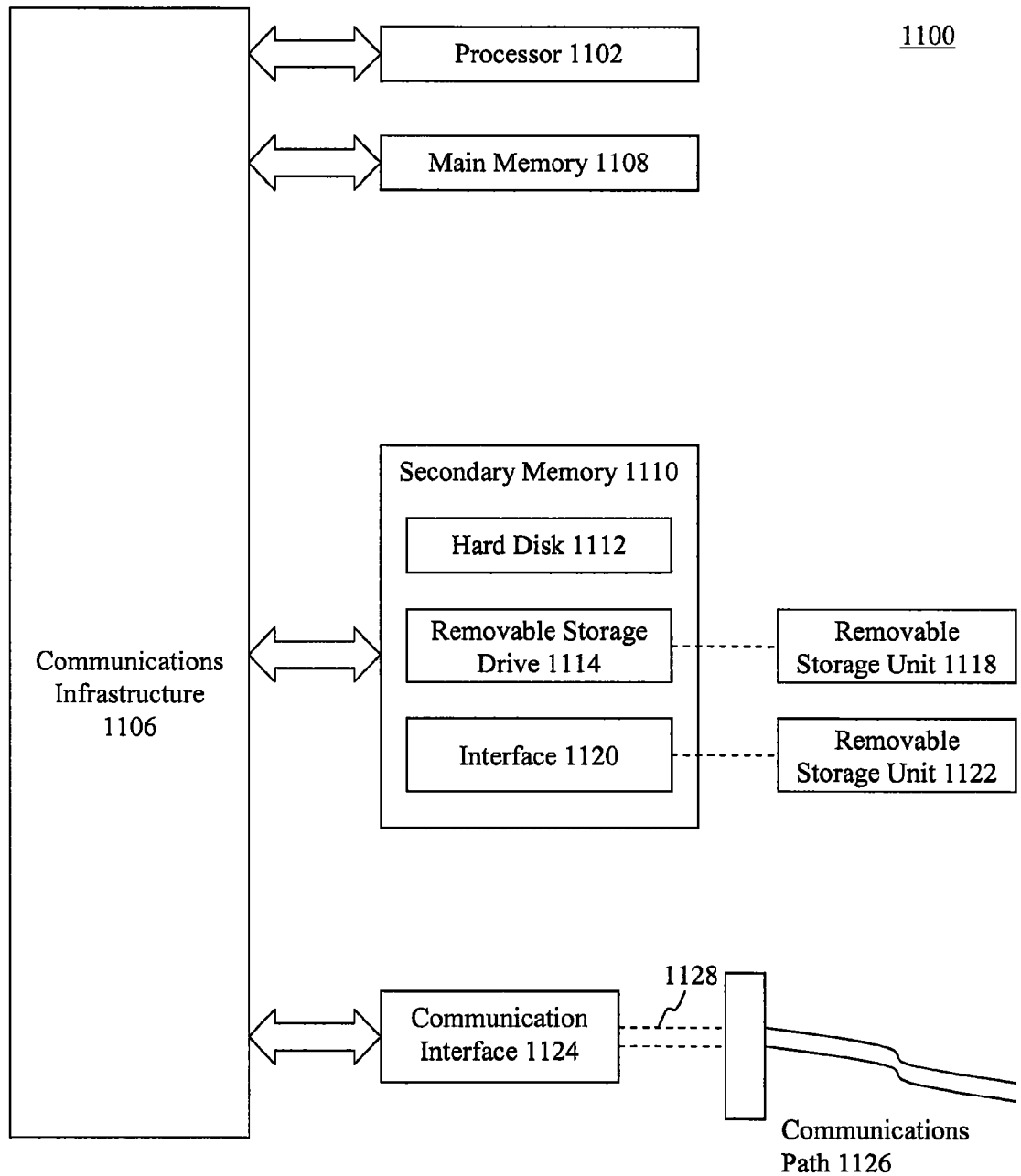
FIG. 11 is a diagram of an exemplary computer system 1100 upon which the present invention may be implemented.

FIG. 11 is a diagram of an exemplary computer system 1100 upon which the present invention may be implemented. The exemplary computer system 1100 includes one or more processors, such as processor 1102. The processor 1102 is connected to a communication infrastructure 1106, such as a bus or network. Various software implementations are described in terms of this exemplary computer system. After reading this description, it will become apparent to a person skilled in the relevant art how to implement the invention using other computer systems and/or computer architectures.

Computer system 1100 also includes a main memory 1108, preferably random access memory (RAM), and may include a secondary memory 1110. The secondary memory 1110 may include, for example, a hard disk drive 1112 and/or a removable storage drive 1114, representing a magnetic tape drive, an optical disk drive, etc. The removable storage drive 1114 reads from and/or writes to a removable storage unit 1118 in a well-known manner. Removable storage unit 1118 represents a magnetic tape, optical disk, or other storage medium that is read by and written to by removable storage drive 1114. As will be appreciated, the removable storage unit 1118 can include a computer usable storage medium having stored therein computer software and/or data.

In alternative implementations, secondary memory 1110 may include other means for allowing computer programs or other instructions to be loaded into computer system 1100. Such means may include, for example, a removable storage unit 1122 and an interface 1120. An example of such means may include a removable memory chip (such as an EPROM, or PROM) and associated socket, or other removable storage units 1122 and interfaces 1120, which allow software and data to be transferred from the removable storage unit 1122 to computer system 1100.

Computer system 1100 may also include one or more communications interfaces, such as communications interface 1124. Communications interface 1124 allows software and data to be transferred between computer system 1100 and external devices. Examples of communications interface 1124 may include a modem, a network interface (such as an Ethernet card), a communications port, a PCMCIA slot and card, etc. Software and data transferred via communications interface 1124 are in the form of signals 1128, which may be electronic, electromagnetic, optical or other signals capable of being received by communications interface 1124. These signals 1128 are provided to communications interface 1124 via a communications path (i.e., channel) 1126. This channel 1126 carries signals 1128 and may be implemented using wire or cable, fiber optics, an RF link and other communications channels. In an embodiment of the invention, signals 1128 comprise data packets sent to processor 1102. Information representing processed packets can also be sent in the form of signals 1128 from processor 1102 through communications path 1126.

The terms "computer program medium" and "computer usable medium" are used to refer generally to non-transitory media such as removable storage units 1118 and 1122, a hard disk installed in hard disk drive 1112, and signals 1128, which provide software to the computer system 1100.

Computer programs are stored in main memory 1108 and/or secondary memory 1110. Computer programs may also be received via communications interface 1124. Such computer programs, when executed, enable the computer system 1100 to implement the present invention as discussed herein. In particular, the computer programs, when executed, enable the processor 1102 to implement the present invention. Where the invention is implemented using software, the software may be stored in a computer program product and loaded into computer system 1100 using removable storage drive 1118, hard drive 1112 or communications interface 1124.

V. Conclusion

The disclosed processes provide an accessible, actionable, and easily-executed platform for quantifying and improving an accuracy of linking between customer relationships. Through the disclosed processes, merchants and customers respectively experience fewer point-of-sale (POS) disruptions due to linking errors, thus increasing the potential sales volume of merchants and increasing customer satisfaction. Customers also benefit from more accurate and timely decisions on risk, marketing, and customer service. The disclosed processes improve the ability of businesses, such as financial service companies, to identify their customers and the relationships between their customers, thus improving the ability of these providers to more accurately make decisions on customer risk, customer marketing, and customer service. Further, the disclosed processes also provide actionable items through which businesses may improve the overall accuracy of the linking process.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method comprising:
    selecting, by a computer based system for estimating accuracy of customer relationships, from a database comprising customer relationships data a limited stratified subset of customer relationships data to form a sample data set;
    identifying, by the computer based system, linked relationships associated with different customers and unlinked relationships associated with a same customer as potential linking errors in the sample data set;
    validating, by the computer based system, the potential linking errors to identify actual linking errors of the sample data set;
    storing, by the computer based system, an error type designation of the actual linking errors of the sample data set; and
    estimating, by the computer based system, the linking errors within the database by extrapolating the identified actual linking errors of the sample data set to estimate the linking errors within a data set of the database larger than the sample data set, wherein the estimate includes the linking error type designation.

2. The method of claim 1, wherein the selecting step comprises selecting from the database a plurality of sample customer relationships, wherein each relationship includes at least one of (i) a name, (ii) a street address, (iii) a city, (iv) a state, (v) a zip code, (vi) a social security number, (vii) a date of birth, (viii) a supplemental social security number, (ix) an relationship number, (x) a telephone number, and/or (xi) a customer number associated with the respective customer relationship.

3. The method of claim 1, wherein the identifying step comprises:
    selecting a plurality of pairs of linked relationships from the database to form the sample data set;
    comparing, for each selected pair of linked relationships, elements of data associated with each relationship within the selected pair of linked relationships to generate a set of elemental scores;
    combining, for each selected pair of linked relationships, the set of elemental scores to generate a composite score; and
    analyzing the composite score of each selected pair of linked relationships to identify a potential linking error associated with the selected pair of linked relationships.

4. The method of claim 3, wherein the comparing step comprises applying a rule to each element to determine an elemental score; and wherein the combining step comprises applying a rule to generate the composite score from the set of elemental scores.

5. The method of claim 1, wherein the identifying step comprises:
    selecting from the database a plurality of relationships linked to customers to form the sample data set;
    retrieving, for each customer in the sample data set, a set of candidate relationships that are potentially linked to the respective customer;
    comparing, for each customer in the sample data set, elements of data associated with (i) an relationship linked to the respective customer and (ii) each candidate relationship potentially linked to the respective customer to generate a set of elemental scores for each candidate relationship;
    combining, for each candidate relationship, the set of elemental scores to generate a composite score; and
    analyzing the composite score of each candidate relationship to identify a potential linking error associated with the candidate relationship.

6. The method of claim 5, wherein the retrieving step comprises applying a key based on a portion of at least one element of data associated with the respective customer to the plurality of relationships within the sample to identify the set of candidate relationships.

7. The method of claim 5, wherein the comparing step comprises applying a rule to each element to determine an elemental score; and wherein the combining step comprises applying a rule to generate the composite score from the set of elemental scores.

8. The method of claim 1, further comprising:
analyzing, by the computer based system, the estimated linking errors to identify at least one factor contributing to the linking errors; and
modifying, by the computer based system, a linking procedure in response to the at least one identified factor.

9. An article of manufacture including a non-transitory, tangible computer readable medium having instructions stored thereon that, in response to execution by a computer-based system for estimating the accuracy of the customer relationships, cause the computer-based system to perform operations comprising:
selecting, by the computer based system, from a database comprising customer relationships data a limited stratified subset of customer relationships data to form a sample data set;
identifying, by the computer based system, linked relationships associated with different customers and unlinked relationships associated with a same customer as potential linking errors in the sample data set;
validating, by the computer based system, the potential linking errors to identify actual linking errors of the sample data set;
storing, by the computer based system, an error type designation of the actual linking errors of the sample data set; and
estimating, by the computer based system, the linking errors within the database by extrapolating the identified actual linking errors of the sample data set to estimate the linking errors within a data set of the database larger than the sample data set, wherein the estimate includes the linking error type designation.

10. The non-transitory computer-readable medium of claim 9, wherein each sample customer relationship includes at least one of (i) a name, (ii) a street address, (iii) a city, (iv) a state, (v) a zip code, (vi) a social security number, (vii) a date of birth, (viii) a supplemental social security number, (ix) an relationship number, (x) a telephone number, and/or (xi) a customer number associated with the respective customer relationship.

11. The non-transitory computer-readable medium of claim 9, wherein the identifying comprises:
selecting a plurality of pairs of linked relationships from the database to form the sample data set;
comparing, for each selected pair of linked relationships, elements of data associated with each relationship within the selected pair of linked relationships to generate a set of elemental scores;
combining, for each selected pair of linked relationships, the set of elemental scores to generate a composite score; and
analyzing the composite score of selected each pair of linked relationships to identify a potential linking error associated with the selected pair of linked relationships.

12. The non-transitory computer-readable medium of claim 11, wherein the comparing comprises applying a rule to each element to determine an elemental score; and wherein the combining comprises applying a rule to generate the composite score from the set of elemental scores.

13. The non-transitory computer-readable medium of claim 9, wherein the identifying comprises:
selecting from the database a plurality of relationships linked to customers to form the sample data set;
retrieving, for each customer in the sample data set, a set of candidate relationships that are potentially linked to the respective customer;
comparing, for each customer in the sample data set, elements of obtained data associated with (i) an relationship linked to the respective customer and (ii) each candidate relationship potentially linked to the respective customer to generate a set of elemental scores for each candidate relationship;
combining, for each candidate relationship, the set of elemental scores to generate a composite score; and
analyzing the composite score of each candidate relationship to identify a potential linking error associated with the candidate relationship.

14. The non-transitory computer-readable medium of claim 13, wherein the retrieving comprises applying a key based on a portion of at least one element of data associated with the respective customer to the plurality of relationships within the sample to identify the set of candidate relationships.

15. The non-transitory computer-readable medium of claim 13, wherein the comparing comprises applying a rule to each element to determine an elemental score and wherein the combining comprises applying a rule to generate the composite score from the set of elemental scores.

16. The non-transitory computer-readable medium of claim 9, further comprising:
analyzing the estimated linking errors to identify at least one factor contributing to the linking errors; and
modifying a linking procedure in response to the at least one identified factor.

17. A system comprising:
a tangible, non-transitory memory communicating with a processor for estimating the accuracy of the customer relationships,
the tangible, non-transitory memory having instructions stored thereon that, in response to execution by the processor, cause the processor to perform operations comprising:
select, by the processor, from a database comprising customer relationships data a limited stratified subset of customer relationships data to form a sample data set;
identify by the processor, linked relationships associated with different customers and unlinked relationships associated with a same customer as potential linking errors in the sample data set;
validate by the processor, the potential linking errors to identify actual linking errors of the sample data set;
store, by the processor, an error type designation of the actual linking errors of the sample data set; and
estimate by the processor, the linking errors within the database by extrapolating the identified actual linking errors of the sample data set to estimate the linking errors within a data set of the database larger than the sample data set, wherein the estimate includes the linking error type designation.

18. The computer based system of claim 17, wherein the processor is further configured to:
select a plurality of pairs of linked relationships from the database to form the sample data set;
compare, for each selected pair of linked relationships, elements of obtained data associated with each relationship within the selected pair of linked relationships to generate a set of elemental scores;

combine, for each selected pair of linked relationships, the set of elemental scores to generate a composite score; and analyze the composite score of each selected pair of linked relationships to identify a potential linking error associated with the selected pair of linked relationships.

19. The computer based system of claim 17, wherein the processor is further configured to:

select from the database a plurality of relationships linked to customers to form the sample data set;

retrieve, for each customer in the sample data set, a set of candidate relationships that are potentially linked to the respective customer;

compare, for each customer in the sample data set, elements of data associated with (i) an relationship linked to the respective customer and (ii) each candidate relationship potentially linked to the respective customer to generate a set of elemental scores for each candidate relationship;

combine, for each candidate relationship, the set of elemental scores to generate a composite score; and analyze the composite score of each candidate relationship to identify a potential linking error associated with the candidate relationship.

* * * * *